United States Patent Office 2,815,231
Patented Dec. 3, 1957

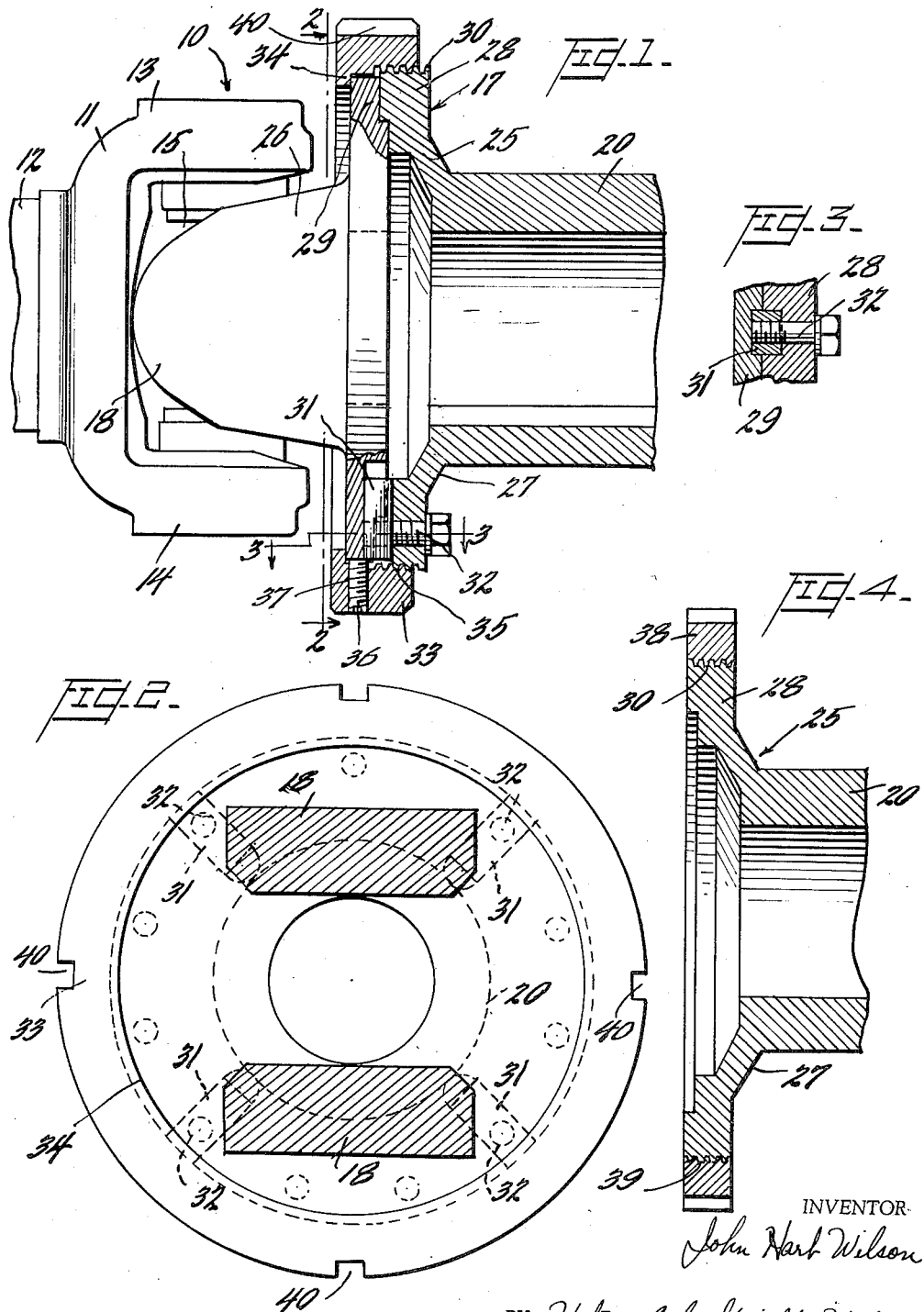

2,815,231

THREADED NUT RING FOR SHAFT COUPLING

John Hart Wilson, Wichita Falls, Tex.

Application February 11, 1954, Serial No. 409,691

1 Claim. (Cl. 287—53)

This invention relates to quick-detachable connections for power transmission shafts or the like and more particularly to quick-detachable connections for Cardan or other type universal joint arrangements.

The general object of the invention is to provide a novel and improved joint of the class described which is simple in construction and application and which greatly facilitates installation, adjustment, and dismantling of heavy power and transmission installations, such as for example those encountered in the oil drilling field.

Universal joint assemblies have been previously suggested embodying the general type assembly as provided by the present invention, i. e., one in which the yoke portion of the assembly comprises two parts with means to connect the two parts together. The construction of the two parts of these earlier yoke arrangements and the means for connecting them together has proven disadvantageous for reasons, among others, that the connecting and dismantling has been time consuming as well as calling for an exacting line-up of the two parts to make the connection. For the most part these previous connections have embodied a plurality of bolts extending through corresponding apertures in the two parts of the yoke. The present invention provides a universal joint assembly having a novel two-part yoke which can be quickly and efficiently dismantled without removal of nuts or bolts thus obviating the above disadvantages.

In its preferred embodiment, the invention contemplates the provision of a universal joint driving connection in which at least one of the fork or yoke elements of the universal joint is made in two principal parts which are adapted to be quickly detached or coupled together when necessary and which involves ingenious application of keys interlocking annular driving plates and a threaded coupling ring to be carried by one of the plates and quickly screwed upon or removed from the threaded margins of the other plate.

Other objects and advantages will be apparent from the following more detailed description of one embodiment of the invention when read in connection with the accompanying drawings in which:

Figure 1 is a view partially in plan and partially in horizontal longitudinal section of a universal joint of the Cardan type which embodies the principles of the present invention;

Figure 2 is a sectional view taken along the line 2—2 of Figure 1;

Figure 3 is a sectional view taken along the line 3—3 of Figure 1; and

Figure 4 is a horizontal longitudinal section of the coupling showing a protecting ring.

The novel quick-detachable universal joint arrangement of the present invention is somewhat similar in construction and function to the quick-detachable universal joint arrangement disclosed in my pending application Serial No. 332,440, filed January 21, 1953. The use of the present quick-detachable driving connections are, of course, applicable to a wide variety of installations; for example, in an oil drilling rig combination as illustrated in my above designated pending application. The novel quick-detachable universal joint coupling is designated generally by the reference numeral 10, and comprises a Cardan joint, one element 11 of which comprises a shank 12 which is suitably connected to one of the shafts or other rotatable parts which are to be coupled and a fork, the arms of which are indicated at 13 and 14. A cross member with its four radial arms is indicated and partly shown at 15 in Fig. 1, and it will be understood by those skilled in the art that this element has bearings at its ends which form pivotal connections for the two forks of the connected yoke members. One of the bearing carrying arms of the fork of the other element or yoke member 17 of the joint is indicated at 18 while the shank portion or socket of this member is shown in section in Fig. 2 and designated 20. This shank or socket portion is suitably connected to the other shaft member by any conventional means.

The novel yoke member 17 of the present invention is made up of two principal parts; namely, the shank or socket portion 25 and the fork portion 26. The portion 25 of the yoke member is flared as at its intermediate portion 27 and provided with a radial flange 28. A second radial flange 29 is carried by the fork portion 26 of the yoke and in operative position is in face-to-face contact with the flange 28. As is shown in Fig. 1 the flange 28 is of a slightly larger diameter than the flange 29 and has an annular threaded portion 30 for purposes hereinafter set forth.

In order to provide positive and sturdy driving connections between the two annular plates or flanges 28 and 29 there is provided a plurality of keying members 31 each of which keying members is inserted in mutually facing radial slots formed in the flanges 28 and 29. Although as many of these driving keys may be used, as is desirable, four of such keys are shown by way of illustration. To obviate the danger of losing the keys upon dismantling the joint, the keys are positively attached to the flange 28 by any suitable means such as threaded bolts 32 each extending through a threaded aperture in the flange and in the keys. It will be understood, of course, that these keys could equally as well be secured to either of the flanges 28 or 29.

In order to maintain the flanges 28 and 29 of the two-part yoke member is snug face-to-face relationship in operation, there is provided an annular clamping ring 33. In the preferred embodiment, the clamping ring is loosely carried by the fork portion 26 of the yoke member and has an annular shoulder 34 which is adapted to abut the rear margin of the flange 29. Ring 33 is internally threaded at 35 and is of such diameter that it can be threaded onto the flange 28. Any suitable means may be used to turn the clamping ring, such as a spanner wrench with a slot 40 being provided in the ring for receiving such a wrench. As can be seen particularly in Fig. 1, when the joint is being assembled, the flanges 28 and 29 can be drawn into snug face-to-face relationship by the clockwise turning of ring 33 as viewed from the left side of the figure. To prevent the unintentional dismantling of the coupling, a set screw 36 is threaded in aperture 37 of the ring with the end of the set screw bearing against the outer surface of flange 29. It is readily seen, therefore, that when it is desirable to disassemble the novel coupling of the present invention, the set screw 36 is first loosened thus freeing the ring 33 for subsequent turning in a counter-clockwise direction to thereby allow the flanges 28 and 29 to be pulled apart. It is apparent, therefore, that with this novel coupling means, the joint can be quickly and easily dismantled without the necessity of removing any nuts or bolts and by backing off only one of the shafts. Obviously, since all connecting elements are attached to one of the principal parts upon assembling and dismantling of the unit there is no chance of any of the parts becoming lost.

When the unit is to remain disassembled for substantially long periods of time, it may be desirable to protect the threads 30 from becoming jammed or mashed and for this purpose I have illustrated an annular protecting ring 38 made of rubber, plastic, or the like. This protecting ring has internal threads 39 so that it may be threaded over the flange 28 upon dismantling and then quickly removed when the unit is to again be coupled. The quick detachable universal joint arrangement as illustrated and described above is by way of example only, and any changes which might occur to one skilled in the art are contemplated by the present invention, within the scope of the following claim.

Having thus described the invention, what is claimed as new and desired to be secured by Letters Patent is:

In a universal joint driving coupling, adapted to couple two rotatable elements such as driving and driven shafts or the like, a yoke member comprising a fork portion for pivotal connection with the cross element of the joint and an oppositely extending shank portion adapted for connection to one of the rotatable elements, said fork and shank portions being each provided with a radial flange, said flanges meeting in face-to-face contact, a concentric circular pilot recess in the contacting face of one of said flanges, a corresponding pilot portion projecting from the contacting face of said other flange, a plurality of pairs of opposed keyways formed in said flanges, a plurality of keys one of which is received in each of said pairs of keyways, means detachably securing each of said keys to one of said flanges, an internally threaded ring carried by one of said portions, said ring adapted to overlie the flange on said one portion, an annular shoulder on said ring adapted to abut said last-mentioned flange, and the other of said flanges having external threads whereby said ring can be threadedly secured to said other flange for clamping application and release relative to said first-mentioned flange.

References Cited in the file of this patent
UNITED STATES PATENTS

| | | |
|---|---|---|
| 1,247,291 | Lehman | Nov. 20, 1917 |
| 1,347,765 | Shrum | July 27, 1920 |
| 1,730,482 | Slyder | Oct. 8, 1929 |
| 1,774,050 | Brown | Aug. 26, 1930 |
| 1,799,884 | Chantry | Apr. 7, 1931 |
| 2,368,457 | Eisenbeis | Jan. 30, 1945 |